United States Patent
Lien et al.

(10) Patent No.: US 10,241,581 B2
(45) Date of Patent: Mar. 26, 2019

(54) RF-BASED MICRO-MOTION TRACKING FOR GESTURE TRACKING AND RECOGNITION

(71) Applicants: Google Inc., Mountain View, CA (US); The Board Of Trustees Of The Leland Stanford Junior University, Palo Alto, CA (US)

(72) Inventors: Jaime Lien, Mountain View, CA (US); Erik M. Olson, Mountain View, CA (US); Patrick M. Amihood, Mountain View, CA (US); Ivan Poupyrev, Sunnyvale, CA (US)

(73) Assignees: Google LLC, Mountain View, CA (US); The Board of Trustees of the Lealand Stanford Junior University, Palo Alto, CA (US)

( * ) Notice: Subject to any disclaimer, the term of this patent is extended or adjusted under 35 U.S.C. 154(b) by 0 days.

(21) Appl. No.: 15/142,689

(22) Filed: Apr. 29, 2016

(65) Prior Publication Data

US 2016/0320853 A1    Nov. 3, 2016

Related U.S. Application Data

(60) Provisional application No. 62/167,823, filed on May 28, 2015, provisional application No. 62/155,357, filed on Apr. 30, 2015.

(51) Int. Cl.
*G06F 3/01* (2006.01)
*G01S 7/41* (2006.01)
(Continued)

(52) U.S. Cl.
CPC .............. *G06F 3/017* (2013.01); *G01S 7/415* (2013.01); *G01S 13/58* (2013.01); *G01S 13/66* (2013.01);
(Continued)

(58) Field of Classification Search
CPC .......... G06F 3/017; G06F 3/011; G01S 7/415; G01S 13/58; G01S 13/66; G01S 13/88;
(Continued)

(56) References Cited

U.S. PATENT DOCUMENTS 3,610,874 A   10/1971   Gagliano
3,752,017 A    8/1973   Lloyd et al.
(Continued)

FOREIGN PATENT DOCUMENTS

CN    202887794    4/2013
CN    103355860    1/2016
(Continued)

OTHER PUBLICATIONS

Bruhtesfa E. Godana, M.Sc.Thesis "Human Movement Characterization in Indoor Environment using GNU Radio Based Radar". Delft University of Technology, 100 pages.*
(Continued)

*Primary Examiner* — Nicholas Lee
*Assistant Examiner* — Ngan T Pham Lu
(74) *Attorney, Agent, or Firm* — Colby Nipper

(57) ABSTRACT

This document describes techniques for radio frequency (RF) based micro-motion tracking. These techniques enable even millimeter-scale hand motions to be tracked. To do so, radar signals are used from radar systems that, with conventional techniques, would only permit resolutions of a centimeter or more.

20 Claims, 10 Drawing Sheets

(51) Int. Cl.
*G01S 13/88* (2006.01)
*G01S 13/66* (2006.01)
*G01S 13/89* (2006.01)
*G01S 13/58* (2006.01)

(52) U.S. Cl.
CPC .............. *G01S 13/88* (2013.01); *G01S 13/89* (2013.01); *G06F 3/011* (2013.01)

(58) Field of Classification Search
CPC .......... G01S 13/89; G01S 13/50; G01S 13/52; G01S 13/524
USPC ...................................................... 345/156
See application file for complete search history.

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,298,715 A | 3/1994 | Chalco et al. |
| 5,341,979 A | 8/1994 | Gupta |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,080,690 A | 6/2000 | Lebby et al. |
| 6,101,431 A | 8/2000 | Niwa et al. |
| 6,210,771 B1 | 4/2001 | Post et al. |
| 6,313,825 B1 | 11/2001 | Gilbert |
| 6,340,979 B1 | 1/2002 | Beaton et al. |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,543,668 B1 | 4/2003 | Fujii et al. |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 7,134,879 B2 | 11/2006 | Sugimoto et al. |
| 7,164,820 B2 | 1/2007 | Eves et al. |
| 8,314,732 B2 | 1/2007 | Oswald et al. |
| 7,223,105 B2 | 5/2007 | Weiss et al. |
| 7,230,610 B2 | 6/2007 | Jung et al. |
| 7,249,954 B2 | 7/2007 | Weiss |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,941,676 B2 | 5/2011 | Glaser |
| 7,952,512 B1 | 5/2011 | Delker et al. |
| 8,062,220 B2 | 11/2011 | Kurtz et al. |
| 8,169,404 B1 | 5/2012 | Boillot |
| 8,179,604 B1 | 5/2012 | Prada Gomez et al. |
| 8,282,232 B2 | 10/2012 | Hsu et al. |
| 8,289,185 B2 | 10/2012 | Alonso |
| 8,301,232 B2 | 10/2012 | Albert et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,569,189 B2 | 10/2013 | Bhattacharya et al. |
| 8,614,689 B2 | 12/2013 | Nishikawa et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,230,160 B1 | 1/2016 | Kanter |
| 9,235,241 B2 | 1/2016 | Newham et al. |
| 9,331,422 B2 | 5/2016 | Nazzaro et al. |
| 9,335,825 B2 | 5/2016 | Rautianinen et al. |
| 9,354,709 B1 | 5/2016 | Heller et al. |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | Vanblon et al. |
| 9,600,080 B2 | 3/2017 | Poupyrev |
| 9,693,592 B2 | 7/2017 | Robinson et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,921,660 B2 | 3/2018 | Poupyrev |
| 9,933,908 B2 | 4/2018 | Poupyrev |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,034,630 B2 | 7/2018 | Lee et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |

(56) References Cited

U.S. PATENT DOCUMENTS

| | | |
|---|---|---|
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2008/0002027 A1 | 1/2008 | Kondo et al. |
| 2008/0024438 A1 | 1/2008 | Collins et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1* | 5/2009 | Kandori ............... A61B 5/1107 600/595 |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0050133 A1 | 2/2010 | Nishihara et al. |
| 2010/0053151 A1 | 3/2010 | Marti et al. |
| 2010/0065320 A1 | 3/2010 | Urano |
| 2010/0071205 A1 | 3/2010 | Graumann et al. |
| 2010/0094141 A1 | 4/2010 | Puswella |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1* | 9/2010 | Petkie ................... A61B 5/024 600/484 |
| 2010/0281438 A1 | 11/2010 | Latta et al. |
| 2010/0306713 A1 | 12/2010 | Geisner et al. |
| 2010/0313414 A1 | 12/2010 | Sheats |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1 | 4/2011 | Zhang et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0070957 A1 | 3/2014 | Longinotti-Buitoni et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0280295 A1 | 9/2014 | Kurochikin et al. |

(56) References Cited

U.S. PATENT DOCUMENTS

| | | |
|---|---|---|
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368441 A1 | 12/2014 | Touloumtzis |
| 2015/0002391 A1 | 1/2015 | Chen |
| 2015/0009096 A1 | 1/2015 | Lee et al. |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0312041 A1 | 10/2015 | Choi |
| 2015/0317518 A1* | 11/2015 | Fujimaki ............ G08C 17/02 345/633 |
| 2015/0323993 A1 | 11/2015 | Levesque et al. |
| 2015/0332075 A1 | 11/2015 | Burch |
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0140872 A1 | 5/2016 | Palmer et al. |
| 2016/0145776 A1 | 5/2016 | Roh |
| 2016/0170491 A1 | 6/2016 | Jung |
| 2016/0171293 A1 | 6/2016 | Li et al. |
| 2016/0186366 A1 | 6/2016 | McMaster |
| 2016/0216825 A1 | 7/2016 | Forutanpour |
| 2016/0249698 A1 | 9/2016 | Berzowska et al. |
| 2016/0252607 A1 | 9/2016 | Saboo et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320854 A1 | 11/2016 | Lien et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0196513 A1 | 7/2017 | Longinotti-Buitoni et al. |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329425 A1 | 11/2017 | Karagozler et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0196527 A1 | 7/2018 | Poupyrev et al. |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| GB | 2070469 | 9/1981 |
| GB | 2443208 | 4/2008 |
| JP | 2003280049 | 10/2003 |
| JP | 2006234716 | 9/2006 |
| JP | 2011102457 | 5/2011 |
| KR | 1020130137005 | 12/2013 |
| WO | WO-0130123 | 4/2001 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2014019085 | 2/2014 |
| WO | WO-2014116968 | 7/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |

(56) References Cited

FOREIGN PATENT DOCUMENTS

| WO | WO-2015022671 | 2/2015 |
|---|---|---|
| WO | 2016053624 | 4/2016 |
| WO | 2016176600 | 11/2016 |
| WO | 20170200949 | 11/2017 |
| WO | 2018106306 | 6/2018 |

OTHER PUBLICATIONS

"Cardiio", Retrieved from: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.

"Extended European Search Report", EP Application No. 15170577.9, dated Nov. 5, 2015, 12 pages.

"Final Office Action", U.S. Appl. No. 14/312,486, dated Jun. 3, 2016, 32 pages.

"Final Office Action", U.S. Appl. No. 14/504,038, dated Sep. 27, 2016, 23 pages.

"Final Office Action", U.S. Appl. No. 14/504,061, dated Mar. 9, 2016, 10 pages.

"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.

"International Search Report and Written Opinion", Application No. PCT/US2015/044774, dated Nov. 3, 2015, 12 pages.

"International Search Report and Written Opinion", Application No. PCT/US2016/024267, dated Jun. 20, 2016, 13 pages.

"International Search Report and Written Opinion", Application No. PCT/US2016/024273, dated Jun. 20, 2016, 13 pages.

"International Search Report and Written Opinion", Application No. PCT/US2016/032307, dated Aug. 25, 2016, 13 pages.

"International Search Report and Written Opinion", Application No. PCT/US2016/029820, dated Jul. 15, 2016, 14 pages.

"International Search Report and Written Opinion", Application No. PCT/US2015/043963, dated Nov. 24, 2015, 16 pages.

"International Search Report and Written Opinion", Application No. PCT/US2015/050903, dated Feb. 19, 2016, 18 pages.

"International Search Report and Written Opinion", Application No. PCT/US2016/030115, dated Aug. 8, 2016, 18 pages.

"International Search Report and Written Opinion", Application No. PCT/US2015/043949, dated Dec. 1, 2015, 18 pages.

"Non-Final Office Action", U.S. Appl. No. 14/312,486, dated Oct. 23, 2015, 25 pages.

"Non-Final Office Action", U.S. Appl. No. 14/504,038, dated Feb. 26, 2016, 22 pages.

"Non-Final Office Action", U.S. Appl. No. 14/504,061, dated Nov. 4, 2015, 8 pages.

"Non-Final Office Action", U.S. Appl. No. 14/582,896, dated Jun. 29, 2016, 9 pages.

"Non-Final Office Action", U.S. Appl. No. 14/666,155, dated Aug. 24, 2016, 9 pages.

"Non-Final Office Action", U.S. Appl. No. 14/681,625, dated Aug. 12, 2016, 9 pages.

"Non-Final Office Action", U.S. Appl. No. 14/930,220, dated Sep. 14, 2016, 15 pages.

"Notice of Allowance", U.S. Appl. No. 14/504,061, dated Sep. 12, 2016, 7 pages.

"Philips Vital Signs Camera", Retrieved from: <http://www.vitalsignscamera.com/> Apr. 15, 2015, Jul. 17, 2013, 2 pages.

"Restriction Requirement", U.S. Appl. No. 14/666,155, dated Jul. 22, 2016, 5 pages.

"The Instant Blood Pressure app estimates blood pressure with your smartphone and our algorithm", Retrieved at: http://www.instantbloodpressure.com/—on Jun. 23, 2016, 6 pages.

Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.

Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.

Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.

Espina,"Wireless Body Sensor Network for Continuous Cuff-less Blood Pressure Monitoring", International Summer School on Medical Devices and Biosensors, 2006, Sep. 2006, 5 pages.

He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.

Holleis,"Evaluating Capacitive Touch Input on Clothes", Proceedings of the 10th International Conference on Human Computer Interaction, Jan. 1, 2008, 10 pages.

Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.

Patel,"Applications of Electrically Conductive Yarns in Technical Textiles", International Conference on Power System Technology (POWECON), Oct. 30, 2012, 6 pages.

Poh,"A Medical Mirror for Non-Contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.

Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.

Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.

Wijesiriwardana,"Capacitive Fibre-Meshed Transducer for Touch & Proximity Sensing Applications", IEEE Sensors Journal, IEEE Service Center, Oct. 1, 2005, 5 pages.

Zhadobov,"Millimeter-wave Interactions with the Human Body: State of Knowledge and Recent Advances", International Journal of Microwave and Wireless Technologies, Mar. 1, 2011, 11 pages.

Zhang,"Study of the Structural Design and Capacitance Characteristics of Fabric Sensor", Advanced Materials Research (vols. 194-196), Feb. 21, 2011, 8 pages.

"Corrected Notice of Allowance", U.S. Appl. No. 14/312,486, dated Oct. 28, 2016, 4 pages.

"International Search Report and Written Opinion", Application No. PCT/US2016/024289, dated Aug. 25, 2016, 17 pages.

"Non-Final Office Action", U.S. Appl. No. 14/518,863, dated Oct. 14, 2016, 16 pages.

"Notice of Allowance", U.S. Appl. No. 14/312,486, dated Oct. 7, 2016, 15 pages.

"Notice of Allowance", U.S. Appl. No. 14/582,896, dated Nov. 7, 2016, 5 pages.

"Pre-Interview Communication", U.S. Appl. No. 14/513,875, dated Oct. 21, 2016, 3 pages.

Cheng,"Smart Textiles: From Niche to Mainstream", IEEE Pervasive Computing, Jul. 2013, pp. 81-84.

Farringdon,"Wearable Sensor Badge & Sensor Jacket for Context Awareness", Third International Symposium on Wearable Computers, Oct. 1999, 7 pages.

Pu,"Gesture Recognition Using Wireless Signals", Oct. 2014, pp. 15-18.

(56) References Cited

OTHER PUBLICATIONS

Schneegass,"Towards a Garment OS: Supporting Application Development for Smart Garments", Wearable Computers, ACM, Sep. 2014, 6 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"International Search Report and Written Opinion", Application No. PCT/US2016/030177, dated Aug. 2, 2016, 15 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
"Advisory Action", U.S. Appl. No. 14/504,139, dated Aug. 28, 2017, 3 pages.
"Final Office Action", U.S. Appl. No. 14/959,901, dated Aug. 25, 2017, 19 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Pre-Interview Office Action", U.S. Appl. No. 14/862,409, dated Sep. 15, 2017, 16 pages.
"Written Opinion", PCT Application No. PCT/US2016/030177, dated Nov. 3, 2016, 9 pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2011, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017, 7 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Final Office Action", U.S. Appl. No. 14/959,799, dated Jan. 4, 2018, 17 pages.
"Final Office Action", U.S. Appl. No. 15/403,066, dated Oct. 5, 2017, 31 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13 pages.
"International Search Report and Written Opinion", PCT Application No. PCT/US2017/051663, dated Nov. 29, 2017, 16 pages.
"Non-Final Office Action", U.S. Appl. No. 14/518,863, dated Sep. 29, 2017, 20 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/504,139, dated Oct. 18, 2017, 12 pages.

(56) References Cited

OTHER PUBLICATIONS

"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Preliminary Report on Patentability", PCT Application No. PCT/US2016/030177, dated Oct. 31, 2017, 11 pages.
"Restriction Requirement", U.S. Appl. No. 15/362,359, dated Jan. 8, 2018, 5 pages.
"Written Opinion", PCT Application No. PCT/US2017/032733, dated Jul. 26, 2017, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"First Action Interview Office Action", U.S. Appl. No. 15/286,152, dated Mar. 1, 2018, 5 pages.
"First Action Interview Office Action", U.S. Appl. No. 15/166,198, dated Apr. 25, 2018, 8 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Non-Final Office Action", U.S. Appl. No. 15/287,253, dated Apr. 5, 2018, 17 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Written Opinion", PCT Application No. PCT/US2017/032733, dated Jul. 26, 2018, 5 pages.
"Final Office Action", U.S. Appl. No. 15/595,649, dated May 23, 2018, 13 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"Final Office Action", U.S. Appl. No. 14/504,121, dated Jul. 9, 2018, 23 pages.
"Foreign Office Action", Chinese Application No. 201721290290.3, dated Jun. 6, 2018, 3 pages.
"Non-Final Office Action", U.S. Appl. No. 15/586,174, dated Jun. 18, 2018, 7 pages.
"Non-Final Office Action", U.S. Appl. No. 15/286,512, dated Jun. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/862,409, dated Jun. 6, 2018, 7 pages.
"Notice of Allowance", U.S. Appl. No. 15/142,619, dated Aug. 13, 2018, 9 pages.
"Pre-Interview Communication", U.S. Appl. No. 15/362,359, dated May 17, 2018, 4 pages.
"Pre-Interview Communication", U.S. Appl. No. 15/287,359, dated Jul. 24, 2018, 2 pages.
"Corrected Notice of Allowance", U.S. Appl. No. 15/362,359, dated Sep. 17, 2018, 10 pages.
"Final Office Action", U.S. Appl. No. 15/166,198, dated Sep. 27, 2018, 33 pages.
"Foreign Office Action", Korean Application No. 10-2017-7027877, dated Nov. 23, 2018, 5 pages.
"Non-Final Office Action", U.S. Appl. No. 15/287,253, dated Sep. 7, 2018, 20 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 14/504,139, dated Oct. 5, 2018, 16 pages.
"Non-Final Office Action", U.S. Appl. No. 15/286,537, dated Nov. 19, 2018, 18 pages.
"Notice of Allowance", U.S. Appl. No. 14/874,955, dated Oct. 4, 2018, 8 pages.
"Notice of Allowance", U.S. Appl. No. 15/287,200, dated Nov. 6, 2018, 19 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Restriction Requirement", U.S. Appl. No. 15/286,537, dated Aug. 27, 2018, 8 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2017, 12 pages.

(56) References Cited

OTHER PUBLICATIONS

"Final Office Action", U.S. Appl. No. 15/286,512, dated Dec. 26, 2018, 15 pages.
"International Preliminary Report on Patentability", PCT Application No. PCT/US2017/032733, dated Nov. 29, 2018, 7 pages.
"Non-Final Office Action", U.S. Appl. No. 15/287,155, dated Dec. 10, 2018, 12 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Restriction Requirement", U.S. Appl. No. 15/462,957, dated Jan. 4, 2019, 6 pages.

\* cited by examiner ived from a hand 120 acting within the radar field 112

RF-BASED MICRO-MOTION TRACKING FOR GESTURE TRACKING AND RECOGNITION

RELATED APPLICATIONS

This application claims priority under 35 U.S.C. § 119(e) to U.S. Patent Provisional Application Ser. No. 62/155,357 filed Apr. 30, 2015, and U.S. Patent Provisional Application Ser. No. 62/167,823 filed May 28, 2015, the disclosures of which are incorporated by reference herein in their entirety.

BACKGROUND

Small-screen computing devices continue to proliferate, such as smartphones, computing bracelets, rings, and watches. Like many computing devices, these small-screen devices often use virtual keyboards to interact with users. On these small screens, however, many people find interacting through virtual keyboards to be difficult, as they often result in slow and inaccurate inputs. This frustrates users and limits the applicability of small-screen computing devices.

To address this problem, optical finger- and hand-tracking techniques have been developed, which enable gesture tracking not made on the screen. These optical techniques, however, have been large, costly, or inaccurate thereby limiting their usefulness in addressing usability issues with small-screen computing devices. Other conventional techniques have also been attempted with little success, including radar-tracking systems. These radar tracking systems struggle to determine small gesture motions without having large, complex, or expensive radar systems due to the resolution of the radar tracking system being constrained by the hardware of the radar system.

SUMMARY

This document describes techniques for radio frequency (RF) based micro-motion tracking. These techniques enable even millimeter-scale hand motions to be tracked. To do so, radar signals are used from radar systems that, with conventional techniques, would only permit resolutions of a centimeter or more.

This summary is provided to introduce simplified concepts concerning RF-based micro-motion tracking, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for RF-based micro-motion tracking are described with reference to the following drawings. The same numbers are used throughout the drawings to reference like features and components.

DETAILED DESCRIPTION

Overview

Techniques are described herein that enable RF-based micro-motion tracking. The techniques track millimeter-scale hand motions from radar signals, even from radar systems with a hardware-constrained conventional resolution that is coarser than the tracked millimeter-scale resolution.

A gesturing hand is a complex, non-rigid target with multiple dynamic components. Because of this, the range and velocity of hand sub-components, such as finger tips, a palm, or a thumb, are typically sub-resolution limits of conventional hardware. Thus, conventional hardware must be large, expensive, or complex to track small motions. Even for those conventional hardware that can track small motions, for real-time gesture-recognition applications, tracking algorithms are computationally constrained.

Figure 1:
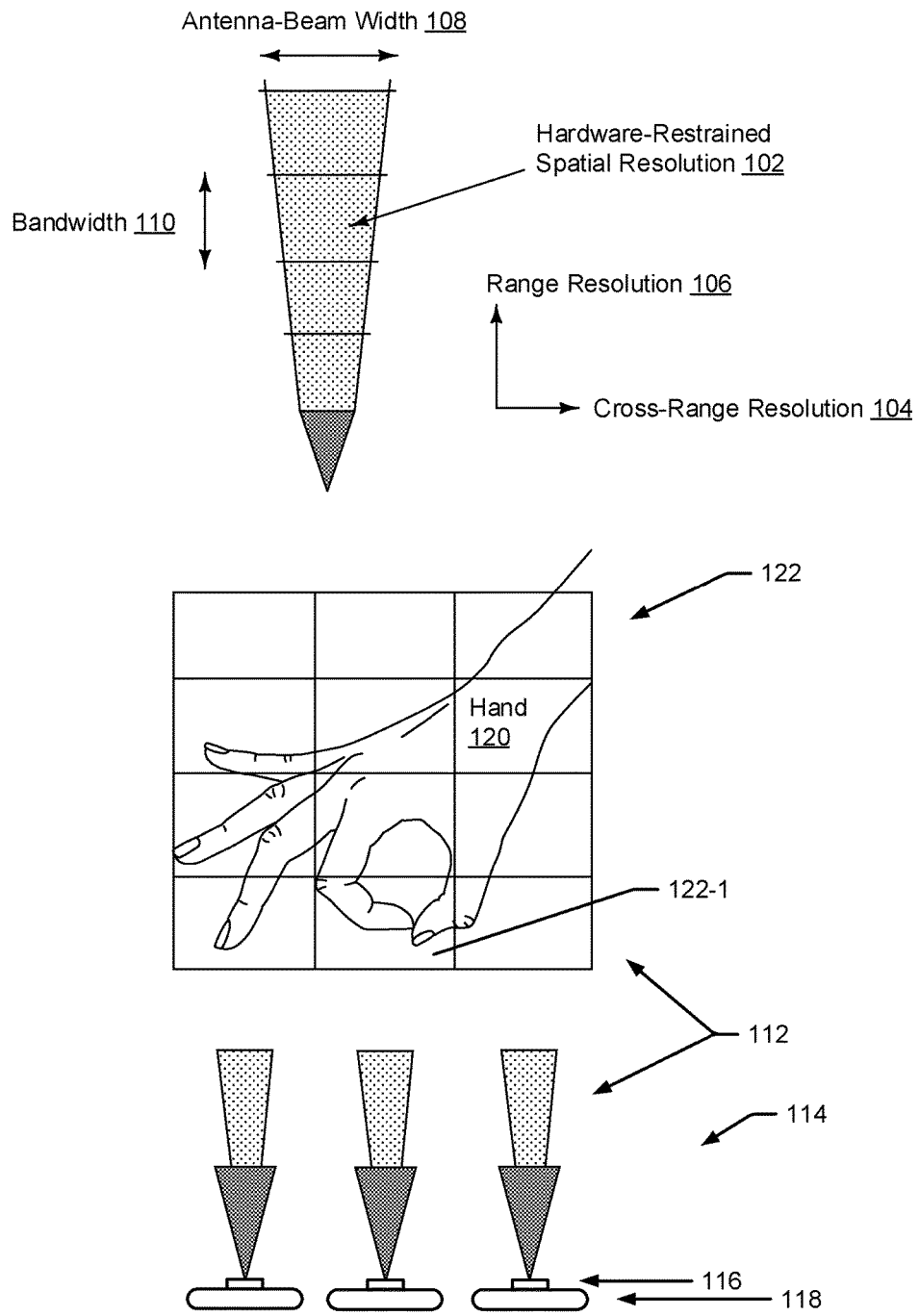
FIG. 1 illustrates a conventional system's hardware-constrained resolution.

Consider a conventional system's hardware-constrained resolution, illustrated in FIG. 1. Here a hardware-constrained spatial resolution 102 consists of a cross-range resolution 104 and a range resolution 106. The cross-range resolution 104 is dependent on an antenna-beam width 108 and the range resolution 106 is dependent on a bandwidth 110, both of which are based on the hardware of the conventional radar system. The bandwidth 110 can be expressed as a pulse width or a wavelength.

To gain a better resolution, multiple antennas are often used in conventional radar systems, increasing complexity and cost. This is shown with a radar field 112 provided by a conventional radar system 114 with three separate radar-emitting elements 116 and antennas 118. Reflections are received from a hand 120 acting within the radar field 112 for each of the separate radar-emitting elements 116. Thus, each of twelve elements 122 are constrained at their size by the radar system's hardware. Note that a micro-motion of the hand 120, such as moving an index-finger against a thumb, would be within a particular element 122-1 of the elements 122. In such a case, the conventional system and techniques cannot determine that the micro-motion was made.

Figure 2:
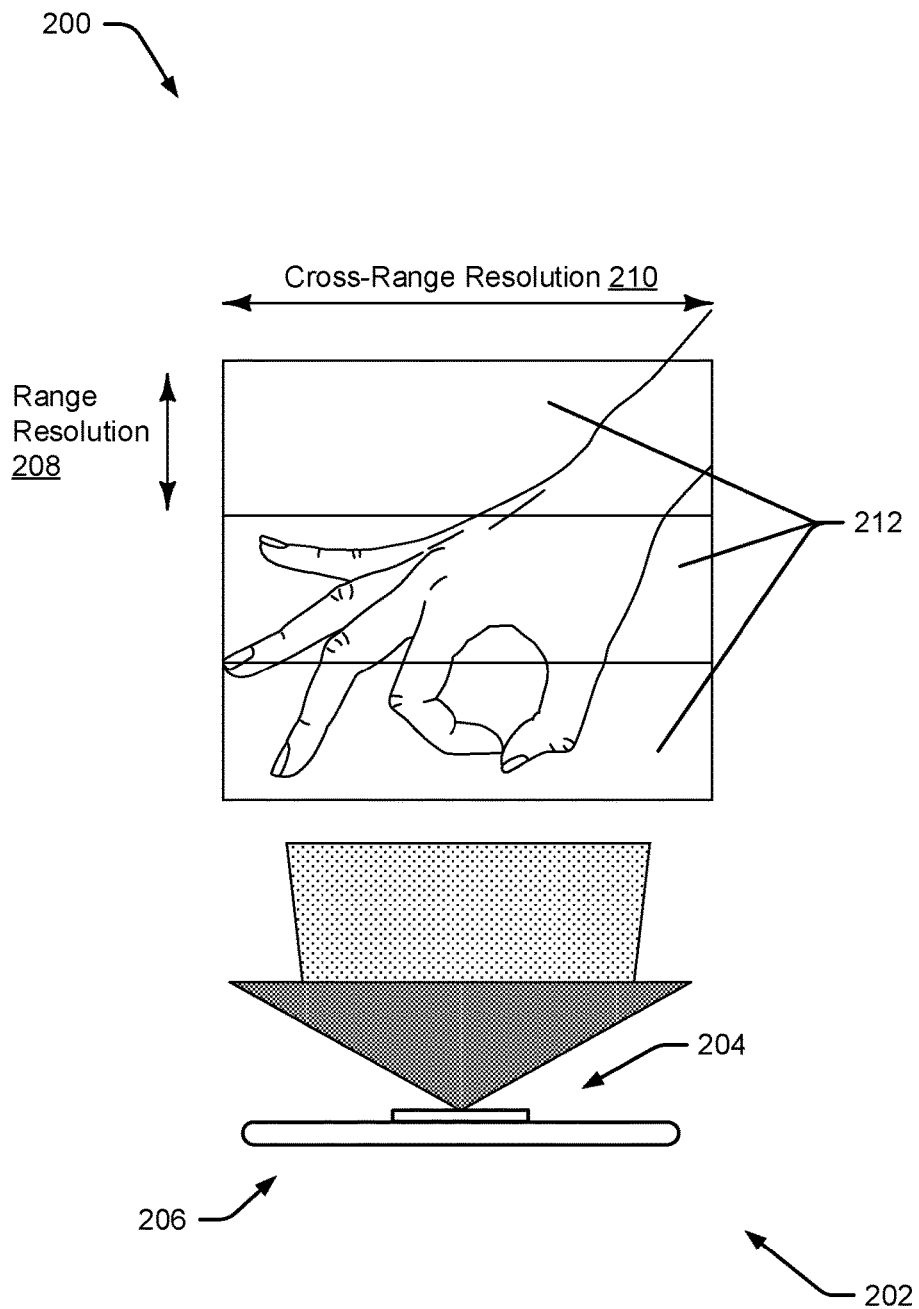
FIG. 2 illustrates an example environment in which techniques enabling RF-based micro-motion tracking may be embodied. The environment illustrates a fairly simple radar system through which techniques for micro-motion tracking can overcome hardware limitations of conventional radar systems, such as those illustrated in FIG. 1.

Contrast FIG. 1 with FIG. 2, which illustrates one environment 200 in which techniques for RF-based micro-motion tracking can overcome hardware limitations of conventional radar systems. In this illustration, a relatively simple radar system 202 is shown, having a single radar-emitting element 204 and a single antenna element 206. Contrast the single radar-emitting element 204 with the multiple radar-emitting elements 116 of FIG. 1, and the single antenna element 206 with the multiple antennas 118 of FIG. 1. Here the simple radar system 202 is simpler, and likely less expensive, smaller, or less complex than the conventional radar system 114. Further, the conventional radar system 114 cannot determine micro-motions of the hand 120 that require a higher resolution than permitted by the size of the elements 122, even with the conventional radar system 114's greater cost, size, or complexity.

As noted, radar systems have hardware-parameter-based displacement-sensing resolution limits for conventional techniques. These limits are based on parameters of the hardware of the system, such that a resolution of the simple radar system 202 has a range resolution 208 and cross-range resolution 210, for a hardware-constrained spatial resolution 212 (shown with three examples). As described below, however, the RF-based micro-motion tracking techniques enable micro-motion tracking of motions that are smaller, and thus a resolution that is finer, than the hardware-constrained limitations would conventionally suggest. Thus, the techniques permit a resolution of the relative displacement that is finer than the wavelength or beam width of the radar system.

This document now turns to an example computing device in which RF-based micro-motion tracking can be used, and then follows with an example method and gestures, and ends with an example computing system.

Example Computing Device

Figure 3:
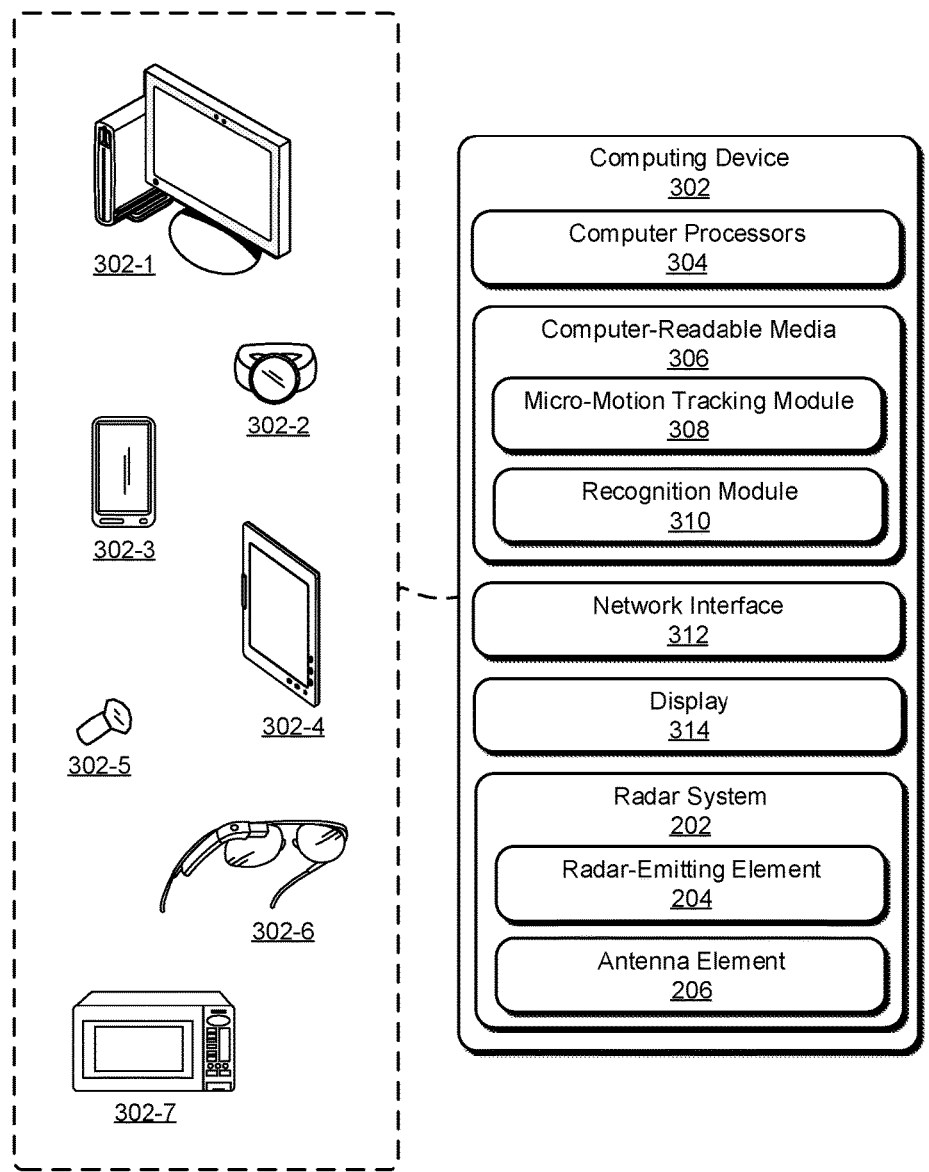
FIG. 3 illustrates a computing device through which determination of RF-based micro-motion tracking can be enabled.

FIG. 3 illustrates a computing device through which RF-based micro-motion tracking can be enabled. Computing device 302 is illustrated with various non-limiting example devices, desktop computer 302-1, computing watch 302-2, smartphone 302-3, tablet 302-4, computing ring 302-5, computing spectacles 302-6, and microwave 302-7, though other devices may also be used, such as home automation and control systems, entertainment systems, audio systems, other home appliances, security systems, netbooks, automobiles, and e-readers. Note that the computing device 302 can be wearable, non-wearable but mobile, or relatively immobile (e.g., desktops and appliances).

The computing device 302 includes one or more computer processors 304 and computer-readable media 306, which includes memory media and storage media. Applications and/or an operating system (not shown) embodied as computer-readable instructions on computer-readable media 306 can be executed by processors 304 to provide some of the functionalities described herein. The computer-readable media 306 also includes a micro-motion tracking module 308 and a recognition module 310, described below.

The computing device 302 may also include one or more network interfaces 312 for communicating data over wired, wireless, or optical networks and a display 314. The network interface 312 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 314 can be integral with the computing device 302 or associated with it, such as with the desktop computer 302-1.

The computing device 302 may also include or be associated with a radar system, such as the radar system 202 of FIG. 2, including the radar-emitting element 204 and the antenna element 206. As noted above, this radar system 202 can be simpler, less costly, or less complex than conventional radar systems that still cannot, with conventional techniques, determine micro motions in the millimeter scale.

Figure 4:
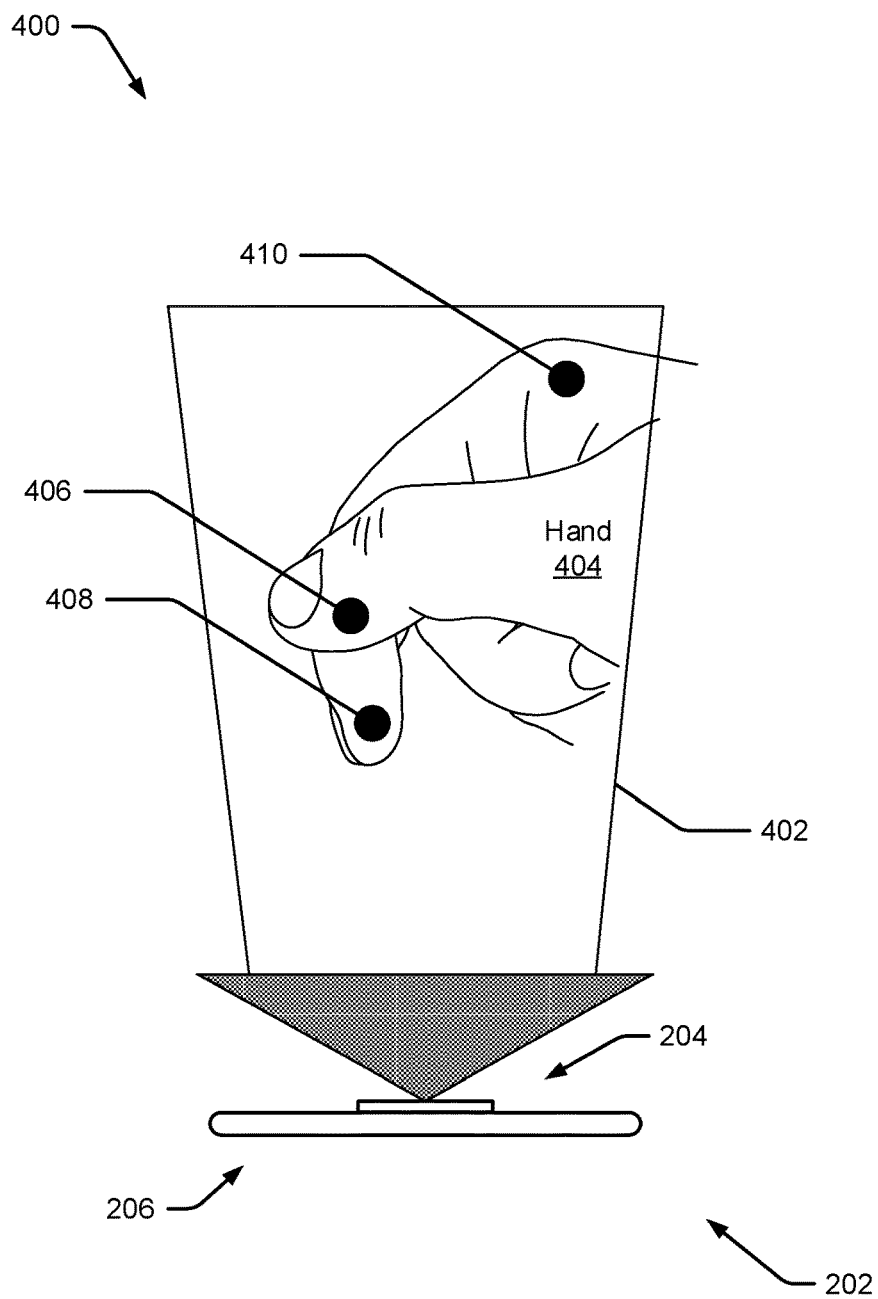
FIG. 4 illustrates the fairly simple radar system of FIG. 2 along with a hand acting within the provided radar field.

The micro-motion tracking module 308 is configured to extract relative dynamics from a radar signal representing a superposition of reflections of two or more points of a hand within a radar field. Consider in more detail the radar system 202 of FIG. 2 at environment 400 of FIG. 4, where the radar system 202 provides a radar field 402 in which a hand 404 may act. This hand 404 has various points of interest, some that move toward the radar antenna element 206, some that move away, and some that are immobile. This is illustrated at a thumb point 406, an index-finger point 408, and a knuckle point 410. Assume that for a micro-motion gesture, that the thumb point 406 is moving away from the antenna element 206, that the index-finger point 408 is moving toward the antenna element 206, and that the knuckle point 410 is immobile.

In more detail, for each of these points the micro-motion tracking module 308 may determine their relative velocity and energy. Thus, assume that the velocity of the thumb point 406 is 1.7 meters per second away, the index-finger point 408 is 2.1 meters per second toward, and the knuckle point 410 is zero meters per second. The micro-motion tracking module 308 determines a velocity profile for these points of the hand using the radar signal.

Figure 5:
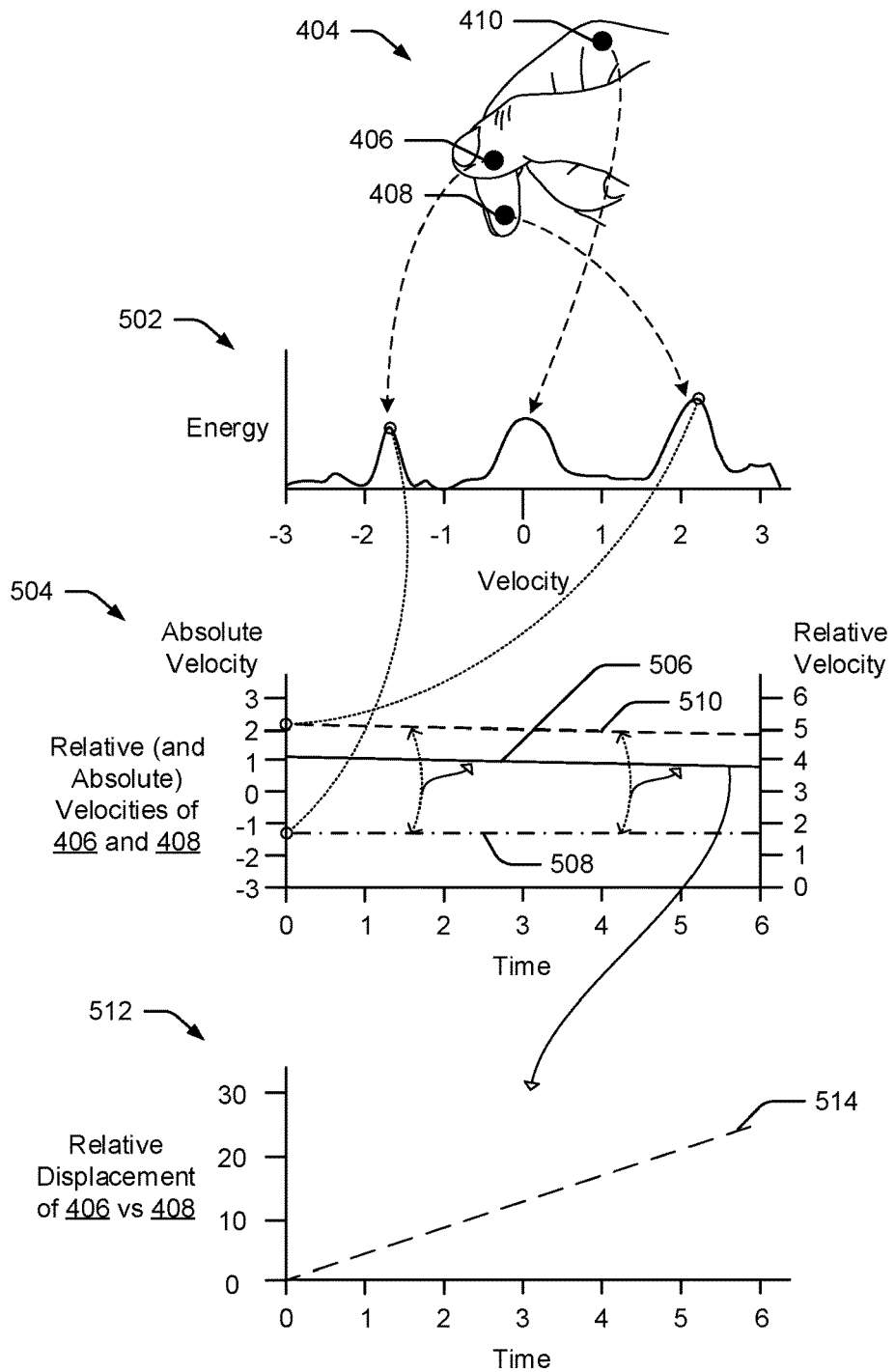
FIG. 5 illustrates a velocity profile, a relative velocity chart, and a relative displacement chart for points of a hand.

Consider, for example, FIG. 5, which illustrates a velocity profile 502, showing the velocity and energy for three points of hand 404. The velocity profile 502 shows, in arbitrary units, velocity vs energy, with higher energy measurements for the thumb point 406, the index-finger point 408, and the knuckle point 410. The velocity axis shows the knuckle point 410 not moving relative the antenna element 206, but a movement toward and away for the thumb point 406 and the index-finger point 408. The absolute velocity for each point is shown for clarity but is not required for the techniques, relative velocity is sufficient, and can use lighter-weight processing than determining absolute velocities and then comparing them to determine the relative velocity.

With this velocity profile 502, and other prior-determined or later-determined velocity profiles, the techniques can determine relative velocities between the points of the hand 404. Here the highest relative velocity is between the thumb point 406 and the index-finger point 408. The micro-motion tracking module 308 may determine a relative velocity (and then displacement) between the thumb point 406 and the knuckle point 410 or the index-finger point 408, though the relative displacement between the thumb point 406 and the index-finger point 408 is the largest relative displacement, which can improve gesture recognition and fineness of control. This resolution, however, may also or instead be better against other points, such as in cases where noise or other signal quality concerns are present for a point or points of the hand 404.

As noted, the velocity profile 502 indicates energies of each point of the hand 404. This energy is a measure of reflected energy intensity as a function of target range from each point to the emitter or antenna element, e.g., a radial distance from the radar-emitting element. A time delay between the transmitted signal and the reflection is observed through Doppler frequency, and thus the radial velocity is determined, and then integrated for radial distance. This observation of Doppler frequency can be through a range-Doppler-time data cube for the radar signal, though such a format is not required. Whatever the form for the data of the radar signal having the superposition of reflections of the points, integrating the relative velocities can quantitatively combine the Doppler-determined relative dynamics and an unwrapped signal phase of the radar signal. Optionally or in addition, an extended Kalman filter may be used to incorporate raw phase with the Doppler centroid for the point of the hand, which allows for nonlinear phase unwrapping.

In more detail, the following equations represent a manner in which to determine the velocity profile 502. Equation 1 represents incremental changes in phase as a function of incremental change in distance over a time period. More specifically, φ is phase, and thus $\Delta\varphi(t,T)$ is change in phase. $r_i$ is distance, $\Delta r_i$ is displacement, and λ is wavelength, thus $\Delta r_i(t,T)/\lambda$ is change in displacement over wavelength. Each incremental change in phase equates to four π of the displacement change.

$$\Delta\varphi(t,T)=4\pi\Delta r_i(t,T)/\lambda \qquad \text{Equation 1}$$

Equation 2 represents frequency, $f_{Doppler,i}(T)$, which is proportional to the time derivative of the phase, $\frac{1}{2}\pi d\varphi(t,T)/dT$. Then, plugging in the time derivative of the displacement and wavelength, $2/\lambda dr(t,T)/dT$, results in velocity, v, again over wavelength.

$$f_{Doppler,i}(T)=\frac{1}{2}\pi d\varphi(t,T)/dT=2/\lambda dr(t,T)/dT=2v(T)/\lambda \qquad \text{Equation 2}$$

Equations 1 and 2 show the relationship between incremental velocity, such as points of a hand making micro-motions, to how this is shown in the signal reflected from those points of the hand.

Equation 3 shows how to estimate the frequency of the micro motions. The techniques calculate a Doppler spectrum using Doppler centroids, $f_{Doppler,centroid}(T)$, which shows how much energy is at each of the frequencies. The techniques pull out each of the frequencies that corresponds to each of the micro-motions using a centroid summation, $\Sigma_f fF(f)$.

$$f_{Doppler,centroid}(T)=\Sigma_f fF(f) \qquad \text{Equation 3}$$

Thus, the techniques build a profile of energies, such as the example velocity profile 502 of FIG. 2, which are moving at various velocities, such as the thumb point 406, the index-finger point 408, and the knuckle point 410. From this profile, the techniques estimate particular micro-motions as being at particular energies in the profile as described below.

Relative velocities chart 504 illustrates a relative velocity 506 over time. While shown for clarity of explanation, absolute thumb velocity 508 of the thumb point 406 and absolute index-finger velocity 510 of the index-finger 408 are not required. The relative velocity 506 can be determined without determining the absolute velocities. Showing these, however, illustrates the relative velocity between these velocities, and how it can change over time (note the slowdown of the thumb point 406 from 2.1 units to 1.9 units over the six time units).

With the relative velocities 506 determined over the six time units, a relative displacement can then be determined by integrating the relative velocities. This is shown with relative displacement chart 512, which illustrates a displacement trajectory 514. This displacement trajectory 514 is the displacement change of the thumb point 406 relative the index-finger point 408 over the six time units. Thus, the thumb point 406 and the index-finger point 408 move apart over the six time units by 24 arbitrary displacement units.

In some cases, the micro-motion tracking module 308 determines a weighted average of the relative velocities and then integrates the weighted averages to find their relative displacement. The weighted average can be weighted based on velocity readings having a higher probability of an accurate reading, lower noise, or other factors.

As shown in the example of FIG. 5, the techniques enable tracking of micro-motions, including using a low-bandwidth RF signal. This permits tracking with standard RF equipment, such as Wi-Fi routers, rather than having to change RF systems, or add complex or expensive radar systems.

Returning to FIG. 3, the recognition module 310 is configured to determine, based on a relative displacement of points on a hand, a gesture made by the hand. The recognition module 310 may then pass the gesture to an application or device.

Figure 6:
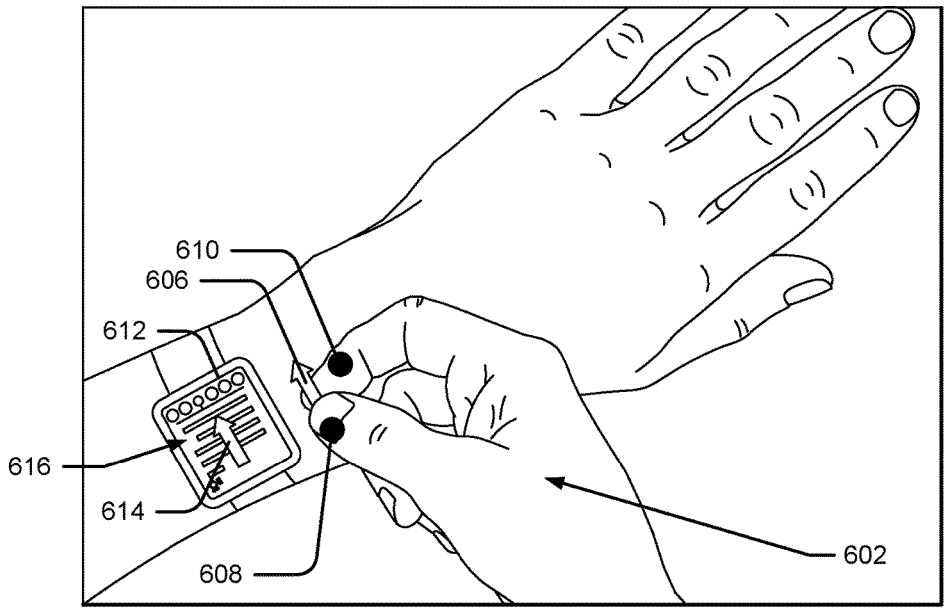
FIG. 6 illustrates an example gesture determined through RF-based micro-motion tracking, the example gesture having a micro-motion of a thumb against a finger, similar to rolling a serrated wheel of a traditional mechanical watch.
Figure 6:
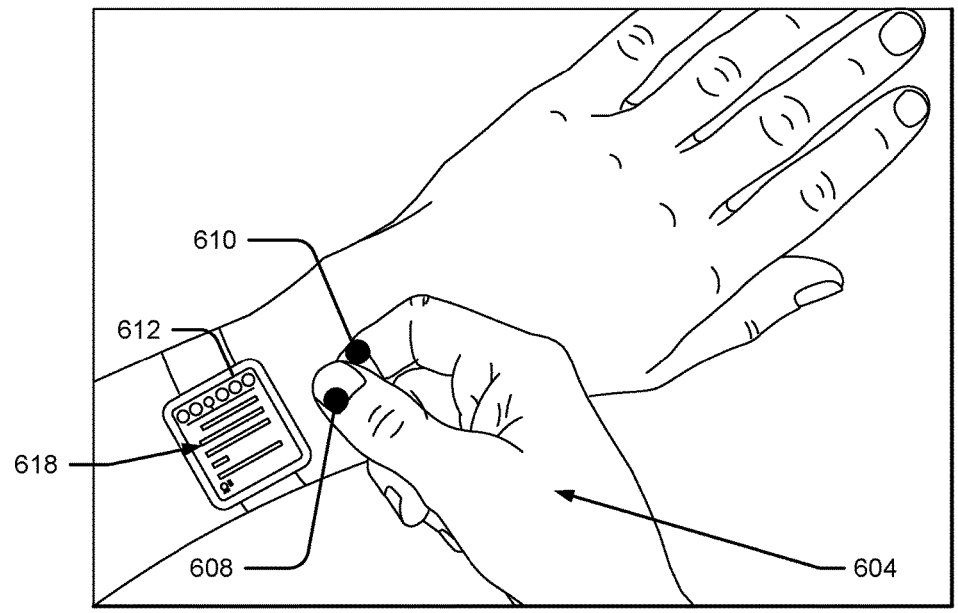

Assume, for example, that the gesture determined is a micro-motion of a thumb against a finger, similar to rolling a serrated wheel of a traditional mechanical watch. This example is illustrated in FIG. 6, which shows a start of the micro-gesture at start position 602, and an end of the micro-gesture at end position 604. Note that a movement 606 is made from the start to the end, but is not shown at intermediate positions for visual brevity. At the start position 602, a thumb point 608 and an index-finger point 610 positioned relative to each other with an end of the thumb at a tip of the finger. At the end position 604, the thumb, and thus the thumb point 608, has moved a few millimeters across the finger, and thus index-finger point 610, are each displaced relative the other by those few millimeters. The techniques are configured to track this gesture at finer resolutions than multiple millimeters, but this shows the start and end, and not intermediate measurements made.

With the displacement between the thumb point 608 and the index-finger point 610 made by the micro-motion tracking module 308, the recognition module 310 determines the gesture, and passes this gesture (generally as multiple sub-gestures as a complete gesture having sub-gesture portions is made) to an application—here to an application of the smart watch, which in turn alters user interface 612 to scroll up text being displayed (scrolling shown at scroll arrow 614 and results shown at starting text 616 and ending text 618). Tracked gestures can be large or small—millimeter scale is not required, nor is use of a single hand or even a human hand, as devices, such as robotic arms tracked to determine control for the robot, can be tracked. Thus, the micro-motion tracking module 308 may track micro-gestures having millimeter or finer resolution and a maximum of five centimeters in total relative displacement, or track a user's arm, hand or fingers relative to another hand, arm, or object, or larger gestures, such as multi-handed gestures with relative displacements of even a meter in size.

Example Method

Figure 7:
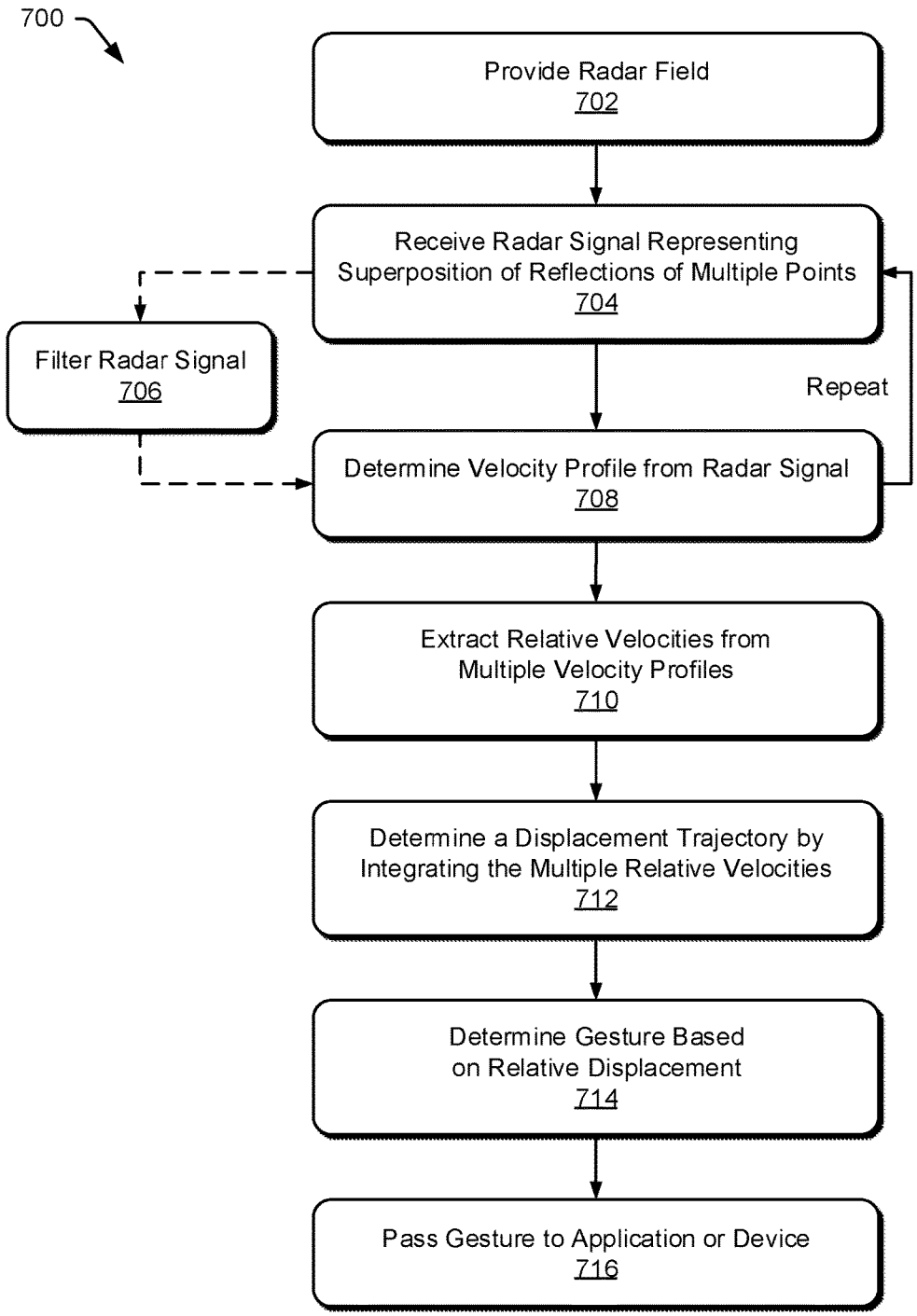
FIG. 7 illustrates an example method enabling gesture recognition through RF-based micro-motion tracking.

FIG. 7 depicts a method 700 that recognizes gestures using RF-based micro-motion tracking. The method 700 receives a radar signal from a radar system in which a hand makes a gesture, determines a displacement at a finer resolution than conventional techniques permit based on the parameters of the radar system, and then, based on this displacement, determine gestures, even micro-motion gestures in a millimeter scale. This method is shown as sets of blocks that specify operations performed but are not necessarily limited to the order or combinations shown for performing the operations by the respective blocks. In portions of the following discussion reference may be made to FIGS. 2-6, 8, and 9, reference to which is made for example only. The techniques are not limited to performance by one entity or multiple entities operating on one device, or those described in these figures.

At 702, a radar field is provided, such as shown in FIG. 2. The radar field can be provided by a simple radar system, including existing WiFi radar, and need not use complex, multi-emitter or multi-antenna, or narrow-beam scanning radars. Instead, a broad beam, full contiguous radar field can be used, such as 57-64 or 59-61 GHz, though other frequency bands, even sounds waves, can be used.

At 704, a radar signal representing a superposition of reflections of multiple points of a hand within the radar field is received. As noted, this can be received from as few as a single antenna. Each of the points of the hand has a movement relative to the emitter or antenna, and thus a movement relative to each other point. As few as two points can be represented and analyzed as noted below.

At 706, the radar signal can be filtered, such as with a Moving Target Indicator (MTI) filter. Filtering the radar signal is not required, but can remove noise or help to locate elements of the signal, such as those representing points having greater movement than others.

At 708, a velocity profile is determined from the radar signal. Examples of this determination are provided above, such as in FIG. 5.

At 710, relative velocities are extracted from the velocity profile. To determine multiple relative velocities over time, one or more prior-determined or later-determined velocity profiles are also determined. Thus, operations 704 and 708 can be repeated by the techniques, shown with a repeat arrow in FIG. 7.

At 712, a displacement trajectory is determined by integrating the multiple relative velocities. Relative velocities extracted from multiple velocity profiles over multiple times are integrated. An example of this is shown in FIG. 5, at the relative displacement chart 512.

At 714, a gesture is determined based on the displacement trajectory between the multiple points of the hand. As noted above, this gesture can be fine and small, such as a micro-gesture performed by one hand, or multiple hands or objects, or of a larger size.

At 716, the gesture is passed to an application or device. The gesture, on receipt by the application or device, is effective to control the application or device, such as to control or alter a display, function, or capability of the application or device. The device can be remote, peripheral, or the system on which the method 700 is performed.

This determined displacement trajectory shows a displacement in the example of FIG. 6 between a point at a knuckle and another point at a fingertip, both of which are moving. It is not required that the RF-based micro-motion tracking techniques track all points of the hand, or even many points, or even track two points in three-dimensional space. Instead, determining displacement relative from one point to another can be sufficient to determine gestures, even those of one millimeter or finer.

Through operations of method 700, relative dynamics are extracted from the radar signal representing the superposition of the reflections of the multiple points of the hand within the radar field. These relative dynamics indicate a displacement of points of the hand relative one to another, from which micro-motion gestures can be determined. As noted above, in some cases extracting relative dynamics from the superposition determines micro-Doppler centroids for the points. These micro-Doppler centroids enable computationally light super-resolution velocity estimates to be determined. Thus, the computational resources needed are relatively low compared to conventional radar techniques, further enabling use of these RF-based micro-motion techniques in small or resource-limited devices, such as some wearable devices and appliances. Not only can these techniques be used on resource-limited devices, but the computationally light determination can permit faster response to the gesture, such as in real time as a small, fine gesture (e.g., a micro-gesture) is made to make small, fine control of a device.

Further, the RF-based micro-motion techniques, by using micro-Doppler centroids, permits greater robustness to noise and clutter than use of Doppler profile peaks. To increase resolution, the micro-motion tracking module 308 may use the phase change of the radar signal to extract millimeter and sub-millimeter displacements for high-frequency movements of the points.

Example Gestures

The RF-based micro-motion techniques described in FIGS. 2-7 enable gestures even in the millimeter or sub-millimeter scale. Consider, for example, FIGS. 8 and 9, which illustrate two such gestures.

Figure 8:
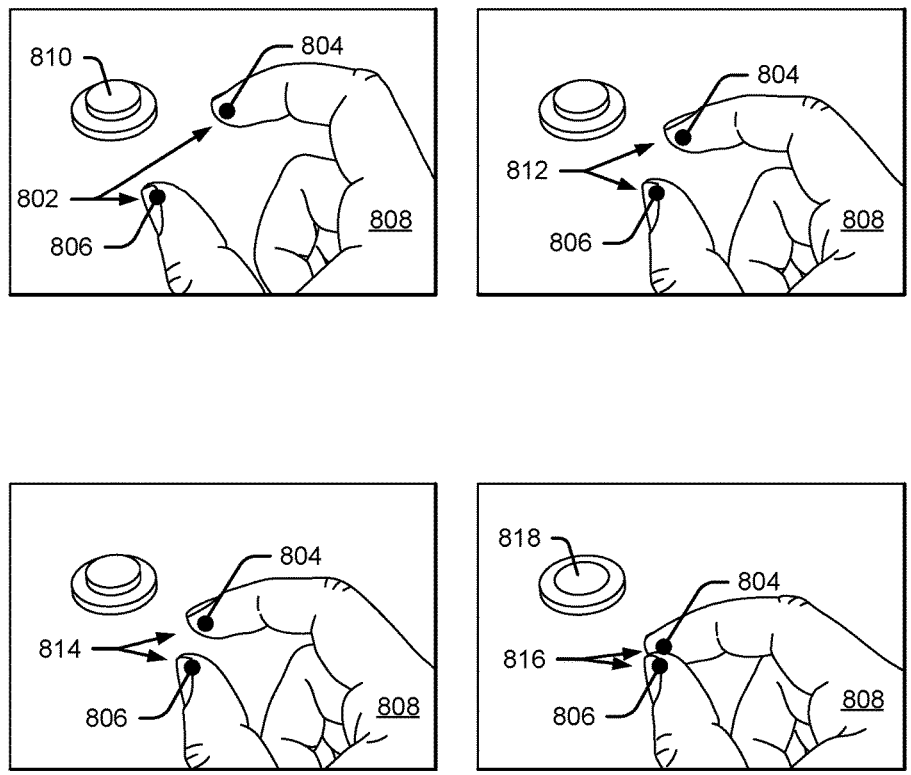
FIG. 8 illustrates an example gesture in three sub-gesture steps, the gesture effective to press a virtual button.

FIG. 8 illustrates a gesture having a resolution of 10 or fewer millimeters, in three sub-gesture steps. Each of the steps can be tracked by the micro-motion module 308, and sub-gestures determined by the recognition module 310. Each of these sub-gestures can enable control, or completion of the last of the sub-gestures may be required prior to control being made. This can be driven by the application receiving the gesture or the recognition module 310, as the recognition module 310 may have parameters from the application or device intended to receive the gesture, such as data indicating that only completion of contact of a thumb and finger should be passed to the application or device.

This is the case for FIG. 8, which shows a starting position 802 of two points 804 and 806 of a hand 808, with a user interface showing an un-pressed virtual button 810. A first sub-gesture 812 is shown where the two points 804 and 806 (fingertip and thumb tip) move closer to each other. A second sub-gesture 814 is also shown where the two points 804 and 806 move even closer. The third sub-gesture 816 completes the gesture where the two points 804 and 806 touch or come close to touching (depending on if the points 804 and 806 are at exactly the tips of the finger and thumb or are offset). Here assume that the micro-motion tracking module 308 determines displacements between the points 804 and 806 at each of the three sub-gestures 812, 814, and 816, and passes these to the recognition module 310. The recognition module 310 waits to pass the complete gesture when the points touch or nearly so, at which point the application receives the gesture and indicates in the user interface that the button has been pressed, shown at pressed virtual button 818.

Figure 9:
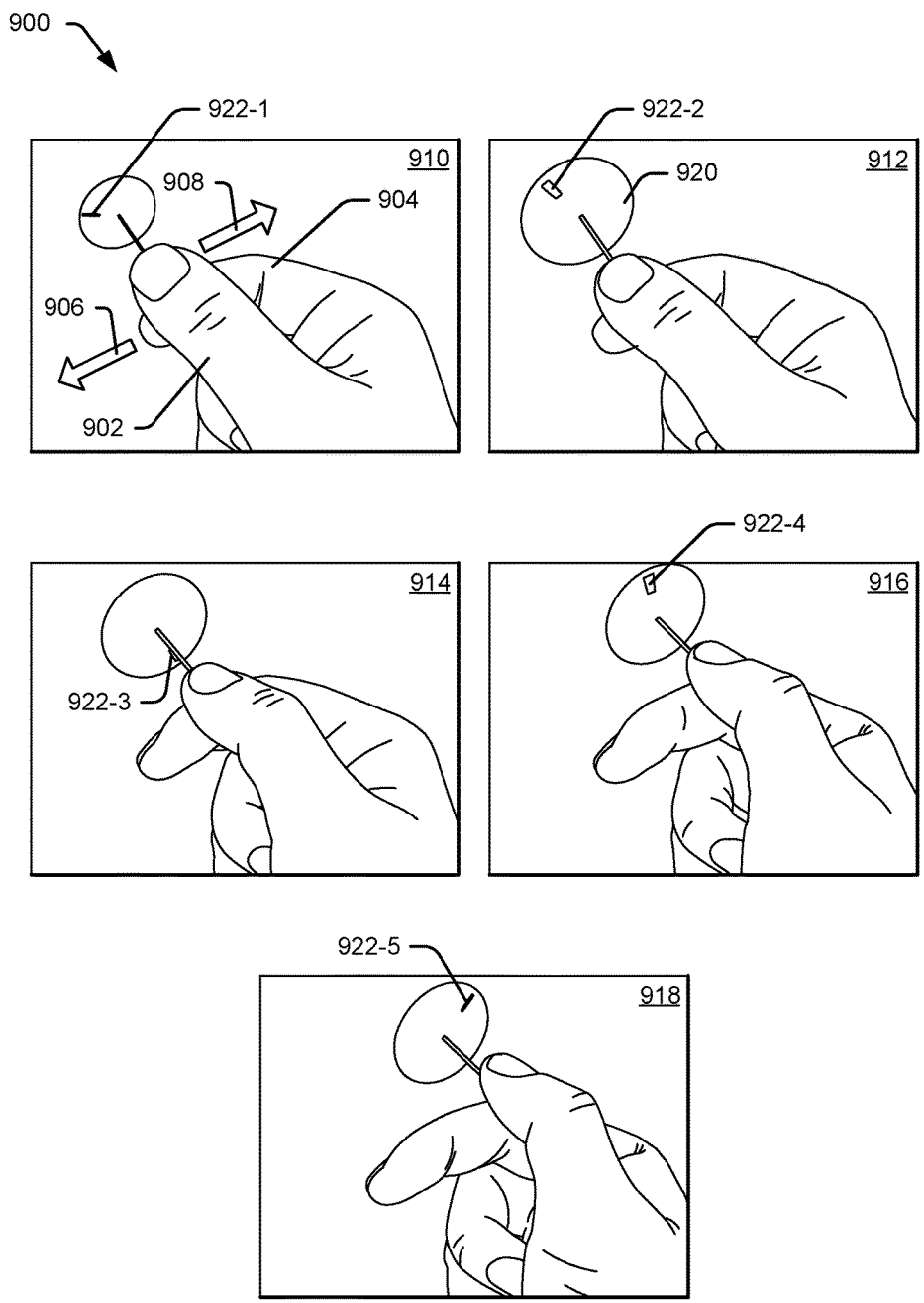
FIG. 9 illustrates an example rolling micro-motion gesture in four steps, the rolling micro-motion gesture permitting fine motion and control through RF-based micro-motion tracking.

By way of further example, consider FIG. 9, which illustrates a rolling micro-motion gesture 900. The rolling micro-motion gesture 900 involves motion of a thumb 902 against an index-finger 904, with both the thumb 902 and the index-finger 904 moving in roughly opposite directions— thumb direction 906 and index-finger direction 908.

The rolling micro-motion gesture 900 is shown at a starting position 910 and with four sub-gestures positions 912, 914, 916, and 918, though these are shown for visual brevity, as many more movements, at even sub-millimeter resolution through the full gesture, can be recognized. To better visualize an effect of the rolling micro-motion gesture 900, consider a marked wheel 920. This marked wheel 920 is not held by the thumb 902 and the index-finger 904, but is shown to aid the reader in seeing ways in which the gesture, as it is performed, can be recognized and used to make fine-resolution control, similar to the way in which a mark 922 moves as the marked wheel 920 is rotated, from a start point at mark 922-1, to mark 922-2, to mark 922-3, to mark 922-4, and ending at mark 922-5.

As the rolling micro-motion gesture 900 is performed, the micro-motion tracking module 308 determines displacement trajectories between a point or points of each of the thumb 902 and the index-finger 904, passes these to the gesture module 310, which in turn determines a gesture or portion thereof being performed. This gesture is passed to a device or application, which is thereby controlled by the micro-motion gesture. For this type of micro-motion, an application may advance through media being played (or reverse if the gesture is performed backwards), scroll through text or content in a display, turn up volume for music, a temperature for a thermostat, or another parameter. Further, because the RF-based micro-motion techniques have a high resolution and light computational requirements, fine motions in real time can be recognized, allowing a user to move her thumb and finger back and forth to easily settle on an exact, desired control, such as a precise volume 34 on a scale of 100 or to precisely find a frame in a video being played.

Example Computing System

Figure 10:
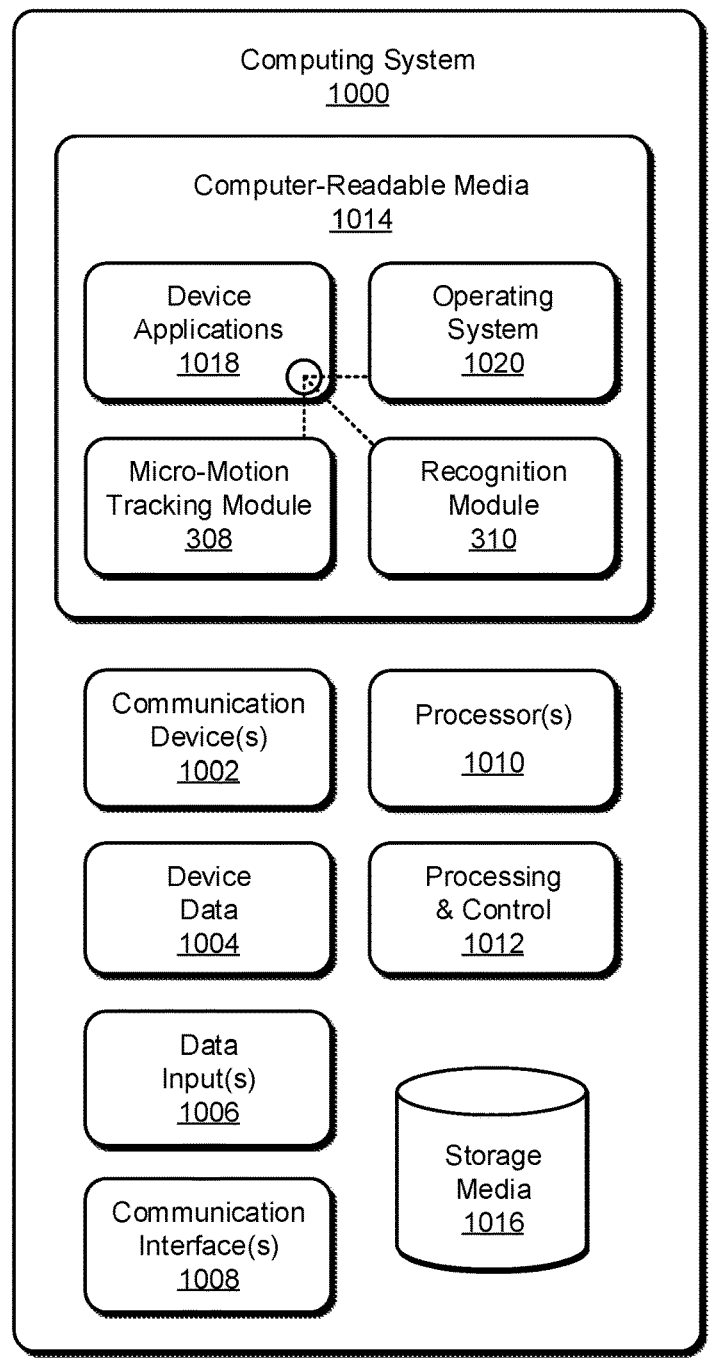
FIG. 10 illustrates an example computing system embodying, or in which techniques may be implemented that enable use of, RF-based micro-motion tracking.

FIG. 10 illustrates various components of an example computing system 1000 that can be implemented as any type of client, server, and/or computing device as described with reference to the previous FIGS. 2-8 to implement RF-based micro-motion tracking.

The computing system 1000 includes communication devices 1002 that enable wired and/or wireless communication of device data 1004 (e.g., received data, data that is being received, data scheduled for broadcast, data packets of the data, etc.). Device data 1004 or other device content can include configuration settings of the device, media content stored on the device, and/or information associated with a user of the device (e.g., an identity of an actor performing a gesture). Media content stored on the computing system 1000 can include any type of audio, video, and/or image data. The computing system 1000 includes one or more data inputs 1006 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. Communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, RF-based micro-motion tracking. Alternatively or in addition, the computing system 1000 can be implemented with any one or combination of hardware, firmware, or fixed logic circuitry that is implemented in connection with processing and control circuits, which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, an abstraction module or gesture module and so on. The device applications 1018 also include system components, engines, or managers to implement RF-based micro-motion tracking, such as the micro-motion tracking module 308 and the recognition module 310.

The computing system 1000 may also include, or have access to, one or more of radar systems, such as the radar system 202 having the radar-emitting element 204 and the antenna element 206. While not shown, one or more elements of the micro-motion tracking module 308 or the recognition module 310 may be operated, in whole or in part, through hardware or firmware.

Conclusion

Although techniques using, and apparatuses including, RF-based micro-motion tracking have been described in language specific to features and/or methods, it is to be understood that the subject of the appended claims is not necessarily limited to the specific features or methods described. Rather, the specific features and methods are disclosed as example implementations of ways in which to determine RF-based micro-motion tracking.

We claim:

1. A computer-implemented method comprising:
receiving a radar signal representing a superposition of reflections of two or more points of a hand within a radar field provided by a radar system, a first of the two or more points having a first movement and a second of the two or more points having a second movement;
determining a velocity profile from the radar signal, the velocity profile indicating energies at multiple velocities, a first of the energies representing a reflection of the first point of the hand having the first movement and a second of the energies representing a reflection of the second point of the hand having the second movement;
extracting, from the velocity profile determined from the radar signal and one or more prior-determined or later-determined velocity profiles determined from radar signals over time, relative velocities between the first and second points of the hand; and determining a displacement trajectory by integrating the relative velocities between the first and second points of the hand, the displacement trajectory representing a relative displacement between the first and second points of the hand.

2. The method of claim 1, wherein determining the velocity profile of the radar signal representing the superposition determines a first and a second micro-Doppler centroid for the first and the second points, respectively.

3. The method of claim 2, further comprising determining the first and second points from the one or more points based on the energies associated with the first and second micro-Doppler centroids being higher than other energies associated with other points of the one or more points.

4. The method of claim 1, further comprising increasing a resolution of the displacement trajectory by extracting millimeter or sub-millimeter displacements using a phase change of the radar signal.

5. The method of claim 1, further comprising filtering the radar signal prior to determining the velocity profile.

6. The method of claim 5, wherein filtering the radar signal includes isolating the first point from the second point using a moving target indicator (MTI) filter to determine points of the two or more points having greater movement than other points of the two or more points.

7. The method of claim 1, wherein the first point is a first finger and the second point is a second finger, and the relative displacement between the first and second points during the first movement and the second movement indicate a millimeter-scale movement of the first finger relative to the second finger.

8. The method of claim 7, wherein the relative displacement for the millimeter-scale movement is at a resolution of one millimeter or finer.

9. The method of claim 1, further comprising determining, based on the relative displacement between the first and second points during the first movement and the second movement, a gesture.

10. The method of claim 9, further comprising passing the gesture to an application or device effective to control or alter a display, function, or capability associated with the application or the device.

11. One or more non-transitory computer-readable storage media having instructions stored thereon that, responsive to execution by one or more computer processors, implement a micro-motion tracking module and a recognition module:
the micro-motion tracking module configured to:
receive a radar signal representing a superposition of reflections of two or more points of a hand within a radar field provided by a radar system, a first of the two or more points having a first movement and a second of the two or more points having a second movement;
determine a velocity profile from the radar signal, the velocity profile indicating energies at multiple velocities, a first of the energies representing a reflection of the first point of the hand having the first movement and a second of the energies representing a reflection of the second point of the hand having the second movement;
extract, from the velocity profile determined from the radar signal and one or more prior-determined or later-determined velocity profiles determined from radar signals over time, relative velocities between the first and second points of the hand; and
determine a displacement trajectory by integrating the relative velocities between the first and second points of the hand, the displacement trajectory representing a relative displacement between the first and second points of the hand, and
the recognition module configured to:
determine, based on the displacement trajectory, a gesture of the first and second points of the hand; and
pass the gesture effective to control or alter a display, function, or capability of a device.

12. The non-transitory computer-readable storage media of claim 11, wherein the micro-motion tracking module is further configured to determine a weighted average of the relative velocities and integrating the relative velocities integrates the weighted average of the relative velocities.

13. The non-transitory computer-readable storage media of claim 12, wherein the determination of the weighted average is based on velocity readings determined to have higher probabilities of accurate readings or lower noise than other velocity readings.

14. The non-transitory computer-readable storage media of claim 11, wherein determining the velocity profile of the radar signal uses a range-Doppler-time data cube for the radar signal.

15. The non-transitory computer-readable storage media of claim 14, wherein integrating the relative velocities comprises quantitatively combining the relative velocities from the range-Doppler-time data cube for the radar signal and an unwrapped signal phase of the radar signal.

16. The non-transitory computer-readable storage media of claim 11, wherein the displacement trajectory represents a sub-gesture step of a complete gesture and wherein the micro-motion tracking module is further configured to determine multiple subsequent displacement trajectories and the recognition module is further configured to determine sub-gestures of the complete gesture and to pass the sub-gestures effective to control or alter the display, function, or capability of the device in real time.

17. An apparatus comprising:
one or more computer processors;
a radar system comprising:
one or more radar-emitting elements configured to provide a radar field; and
one or more antenna elements configured to receive a radar signal representing a superposition of reflections of two or more points of a hand within the radar field; and
one or more computer-readable storage media having instructions stored thereon that, responsive to execution by the one or more computer processors, implement a micro-motion tracking module and a recognition module:
the micro-motion tracking module configured to:
receive the radar signal representing the superposition of reflections of the two or more points of the hand within the radar field provided by the radar system, a first of the two or more points having a first movement and a second of the two or more points having a second movement;
determine a velocity profile from the radar signal, the velocity profile indicating energies at multiple velocities, a first of the energies representing a reflection of the first point of the hand having the first movement and a second of the energies representing a reflection of the second point of the hand having the second movement;
extract, from the velocity profile determined from the radar signal and one or more prior-determined or later-determined velocity profiles determined from radar signals over time, relative velocities between the first and second points of the hand; and determine a displacement trajectory by integrating the relative velocities between the first and second points of the hand, the displacement trajectory representing a relative displacement between the first and second points of the hand, and the recognition module configured to:

determine, based on the displacement trajectory, a gesture of the first and second points of the hand; and pass the gesture to an application of the apparatus or a remote or peripheral device effective to control or alter a display, function, or capability of the apparatus or the remote or peripheral device.

18. The apparatus of claim 17, wherein the radar system has a hardware-parameter-based displacement-sensing resolution limit and a resolution of the relative displacement is finer than the hardware-parameter-based displacement-sensing resolution limit.

19. The apparatus of claim 18, wherein the hardware-parameter-based displacement-sensing resolution limit is based on a wavelength of the radar field provided by the radar system, and wherein the resolution of the relative displacement is finer than the wavelength.

20. The apparatus of claim 17, wherein the one or more radar-emitting elements is one radar-emitting element and the one or more antenna elements is one radar antenna element, and the radar field provided by the radar system is a broad beam, full contiguous radar field.

* * * * *

UNITED STATES PATENT AND TRADEMARK OFFICE
CERTIFICATE OF CORRECTION

PATENT NO. : 10,241,581 B2
APPLICATION NO. : 15/142689
DATED : March 26, 2019
INVENTOR(S) : Jaime Lien et al.

It is certified that error appears in the above-identified patent and that said Letters Patent is hereby corrected as shown below:

On the Title Page

Item (73), Line 2 and 3, after "the" before "Stanford" delete "Lealand" insert --Leland--

Signed and Sealed this
Twenty-first Day of April, 2020

Andrei Iancu
*Director of the United States Patent and Trademark Office*